United States Patent
Hagen et al.

(10) Patent No.: US 8,413,357 B1
(45) Date of Patent: *Apr. 9, 2013

(54) PET TAGS

(75) Inventors: George Lynn Hagen, Flagstaff, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/019,073

(22) Filed: Feb. 1, 2011

Related U.S. Application Data

(63) Continuation-in-part of application No. 12/105,589, filed on Apr. 18, 2008, now Pat. No. 7,877, 909.

(60) Provisional application No. 60/912,609, filed on Apr. 18, 2007, provisional application No. 60/915,739, filed on May 3, 2007.

(51) Int. Cl.
*G09F 3/00* (2006.01)

(52) U.S. Cl. .......................... 40/300; 40/303

(58) Field of Classification Search .............. 40/300, 40/301, 303; 119/653; 206/0.8, 0.82
See application file for complete search history.

(56) References Cited

U.S. PATENT DOCUMENTS

| | | | |
|---|---|---|---|
| 1,246,369 A | 11/1917 | Winans | |
| 1,452,250 A | 4/1923 | Moore et al. | |
| 1,539,744 A | 5/1925 | Kelly | |
| 2,497,632 A | 2/1950 | Schacht | |
| 3,123,926 A | 3/1964 | Jacobson | |
| 3,678,705 A | 7/1972 | Korwin | |
| 3,964,187 A | 6/1976 | Stumpf | |
| 4,087,989 A | 5/1978 | Taran | |
| 4,122,947 A | 10/1978 | Falla | |
| 4,137,660 A | 2/1979 | Dettmann et al. | |
| 4,428,327 A * | 1/1984 | Steckel | 119/655 |
| 4,616,435 A | 10/1986 | Perfect | |
| 4,984,683 A * | 1/1991 | Eller | 206/38 |
| 5,083,662 A | 1/1992 | Bishop et al. | |
| 5,092,067 A | 3/1992 | Prout | |
| 5,414,948 A | 5/1995 | Kudo | |

(Continued)

FOREIGN PATENT DOCUMENTS

WO WO 2005089300 A2 9/2005

OTHER PUBLICATIONS

Animal Treasures, Unique Gifts for Pet Lovers, 2006, UK.

(Continued)

*Primary Examiner* — Joanne Silbermann
*Assistant Examiner* — Kristina Junge
(74) *Attorney, Agent, or Firm* — Booth Udall Fuller, PLC

(57) ABSTRACT

Implementations of pet tags and related protective and alignment features. A pet tag may comprise a raised edge of a concave design, a recessed design or a bordered design. Single or multiple piece implementations may be used to protect an image to be marked on one or both sides of a pet tag. Implementations may comprise multiple pet tags pre-assembled or assembled after marking to further protect one or more images marked on the tags. Other implementations may comprise removable brackets to adapt the pet tags to particular marking kiosks. Still other implementations may comprise crystals embedded in the marking substrate with an additional substrate coupled to a rear side of the marking substrate.

19 Claims, 11 Drawing Sheets

U.S. PATENT DOCUMENTS

| | | |
|---|---|---|
| 5,429,393 A | 7/1995 | Parlo |
| 5,799,511 A | 9/1998 | Benderly |
| 6,059,495 A | 5/2000 | Mueller et al. |
| 6,186,711 B1 | 2/2001 | Mueller |
| 6,286,823 B1 | 9/2001 | Morghen |
| 6,321,430 B1 | 11/2001 | Goldman et al. |
| 6,329,918 B1 | 12/2001 | Moyer |
| 6,334,745 B1 | 1/2002 | Bennett, Sr. |
| 6,367,426 B1 | 4/2002 | Schaible |
| 6,543,161 B2 | 4/2003 | Chin |
| 6,735,894 B2 | 5/2004 | Crusenberry et al. |
| 6,943,314 B2 | 9/2005 | Kosted |
| 6,976,814 B2 | 12/2005 | Newman |
| 7,877,909 B1 * | 2/2011 | Hagen et al. .................. 40/300 |
| 2002/0005048 A1 | 1/2002 | Kimura |
| 2002/0066378 A1 | 6/2002 | Almblad et al. |
| 2003/0033737 A1 | 2/2003 | Bradshaw et al. |
| 2004/0159028 A1 | 8/2004 | Muguerza |
| 2006/0032464 A1 | 2/2006 | Newman |
| 2006/0059757 A1 | 3/2006 | Didulo |
| 2006/0185390 A1 | 8/2006 | Pratt et al. |
| 2008/0135421 A1 * | 6/2008 | Raisner et al. .................. 206/8 |
| 2008/0266837 A1 | 10/2008 | Mehler et al. |

OTHER PUBLICATIONS

Dog Tags, Inc., Dog Tag Supplies: Rubber Silencers, 2007, Branford, CT.

* cited by examiner

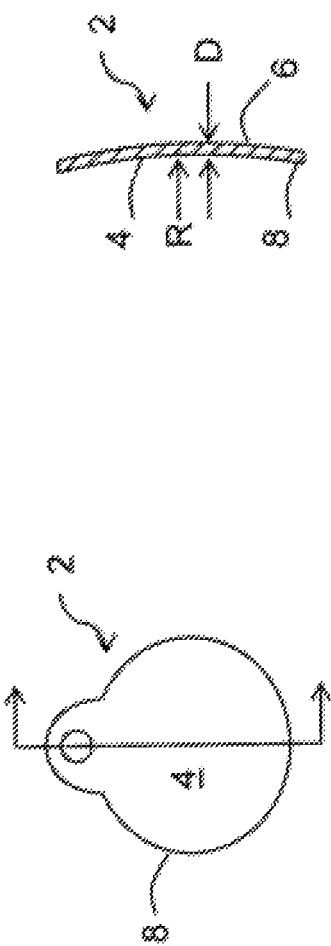
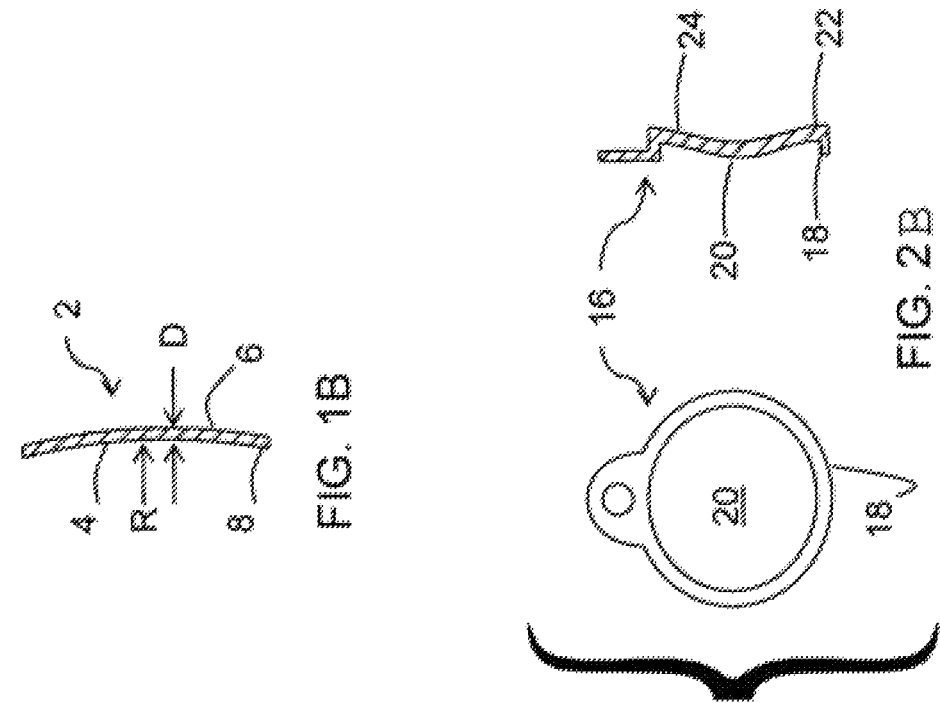
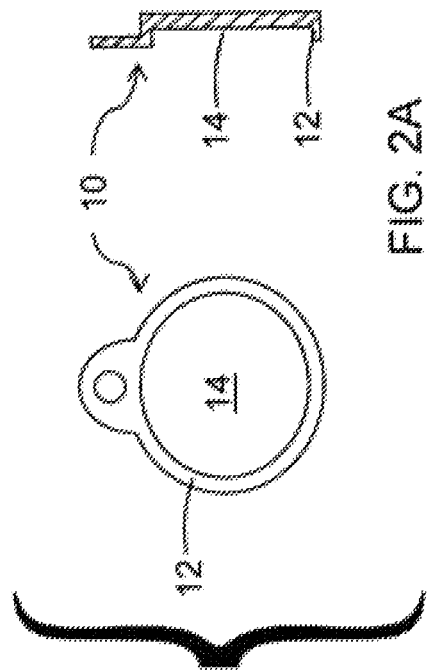
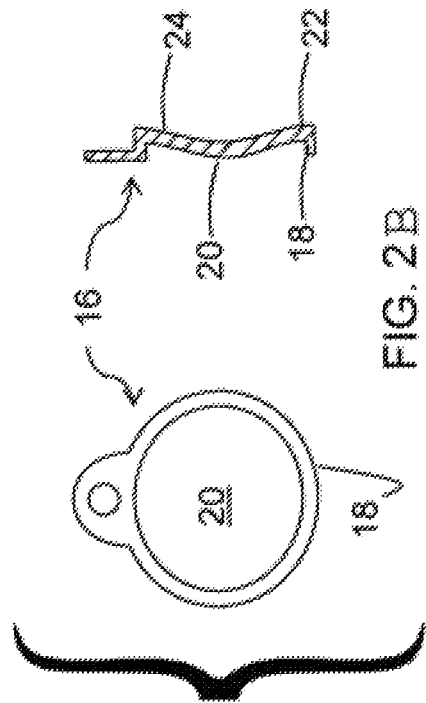
FIG. 1A
FIG. 1B
FIG. 2A
FIG. 2B

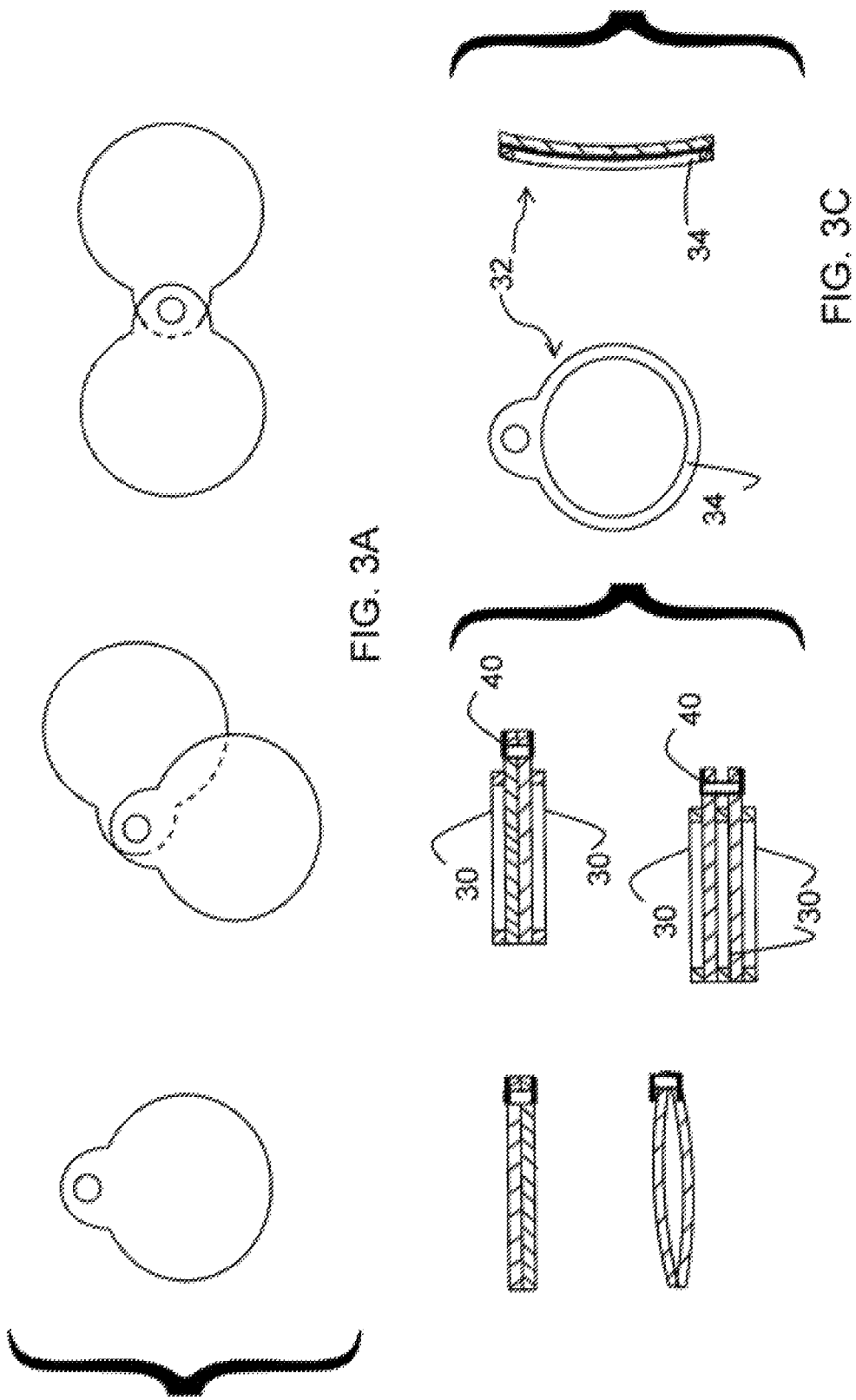

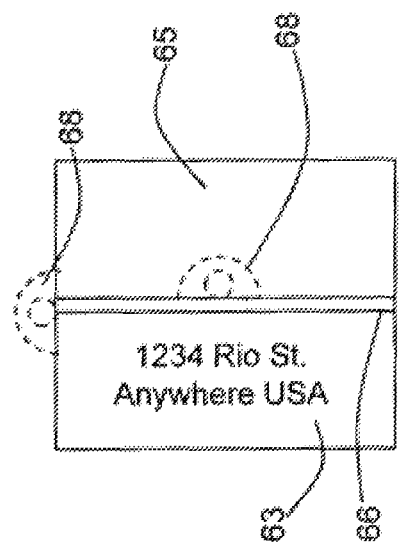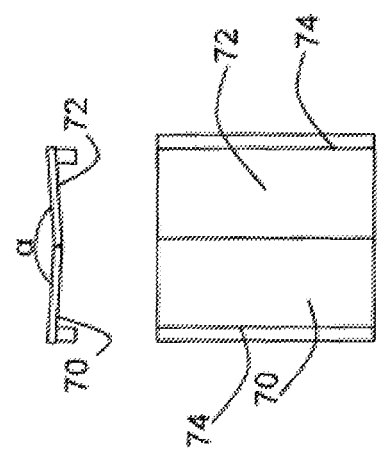
FIG. 3G
FIG. 3H
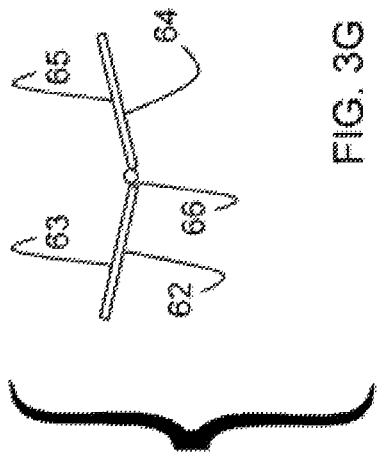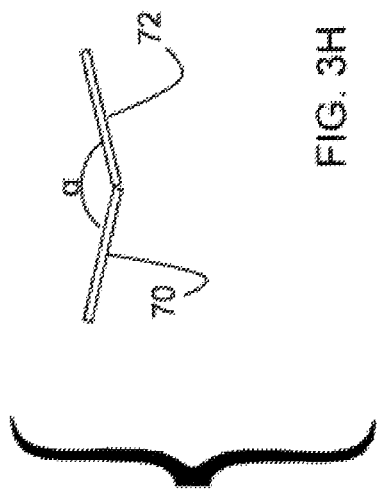

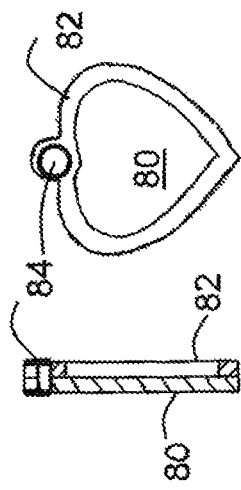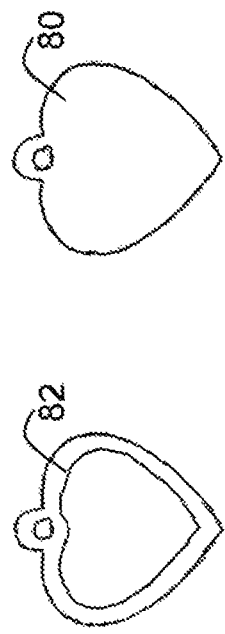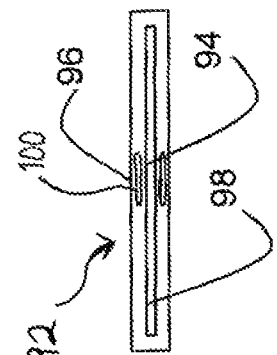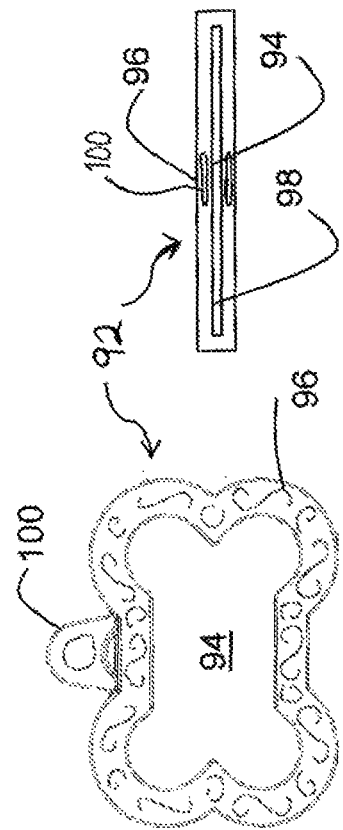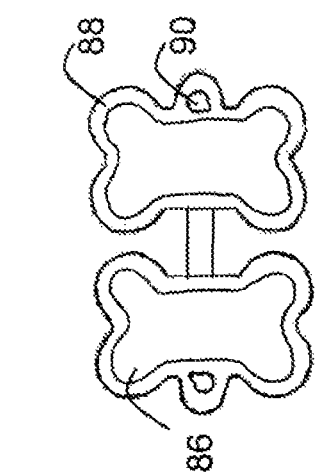

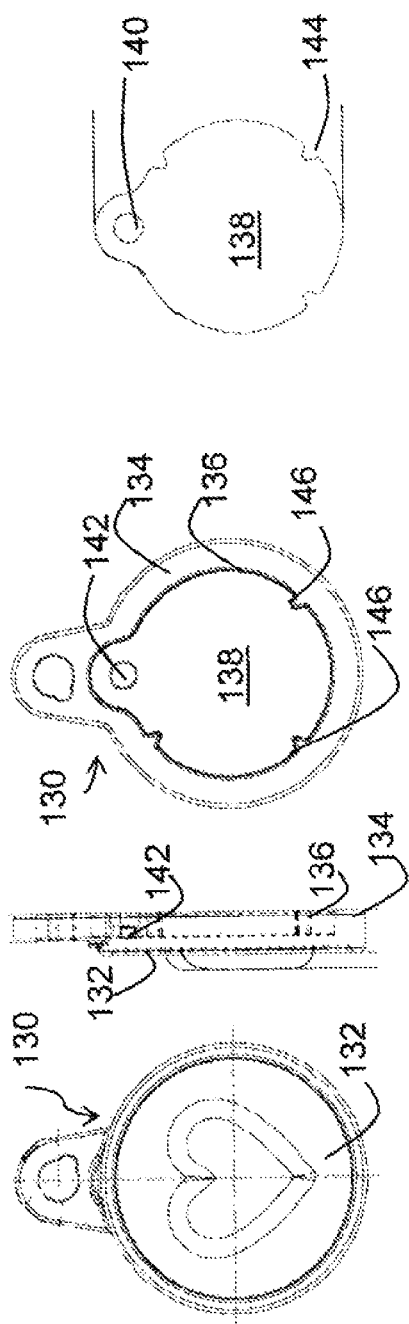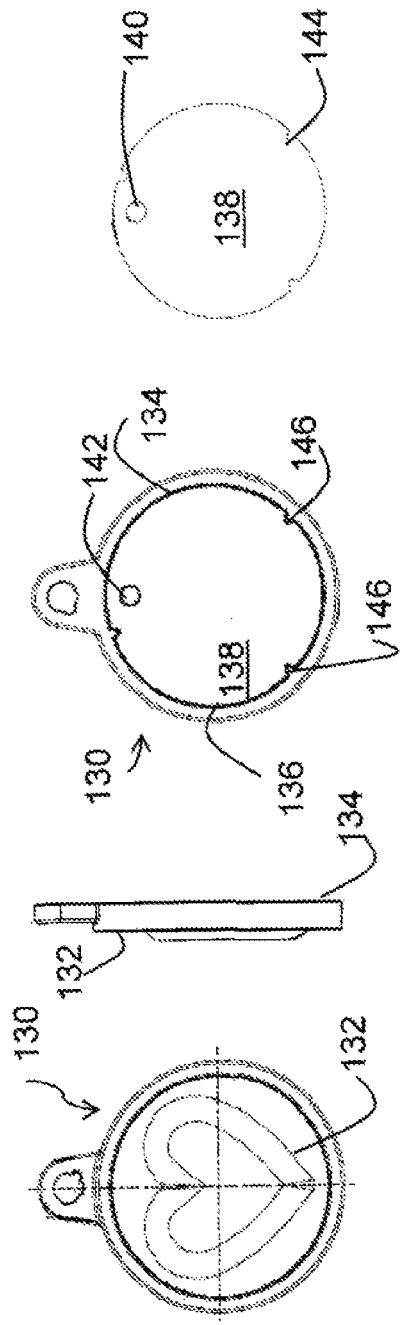

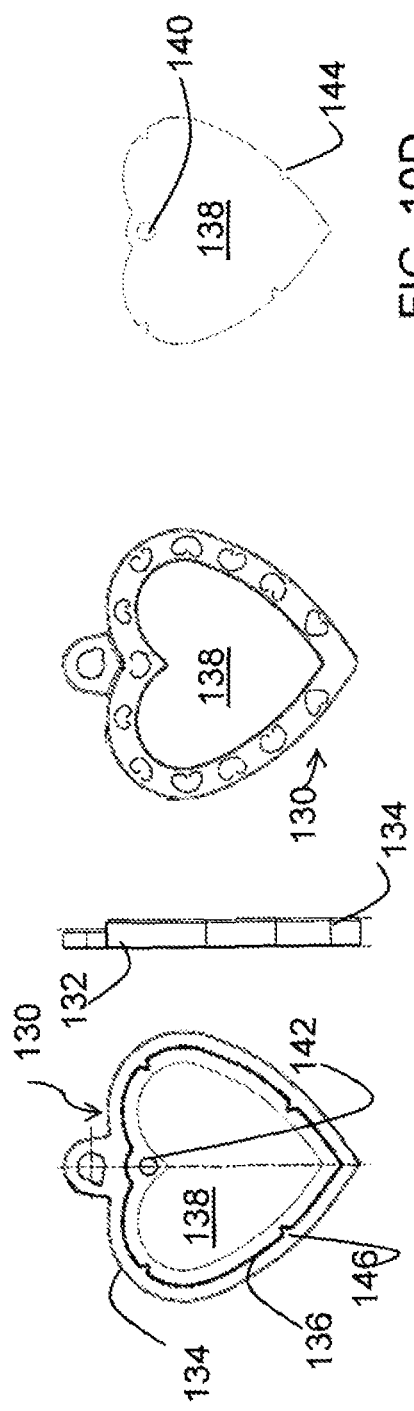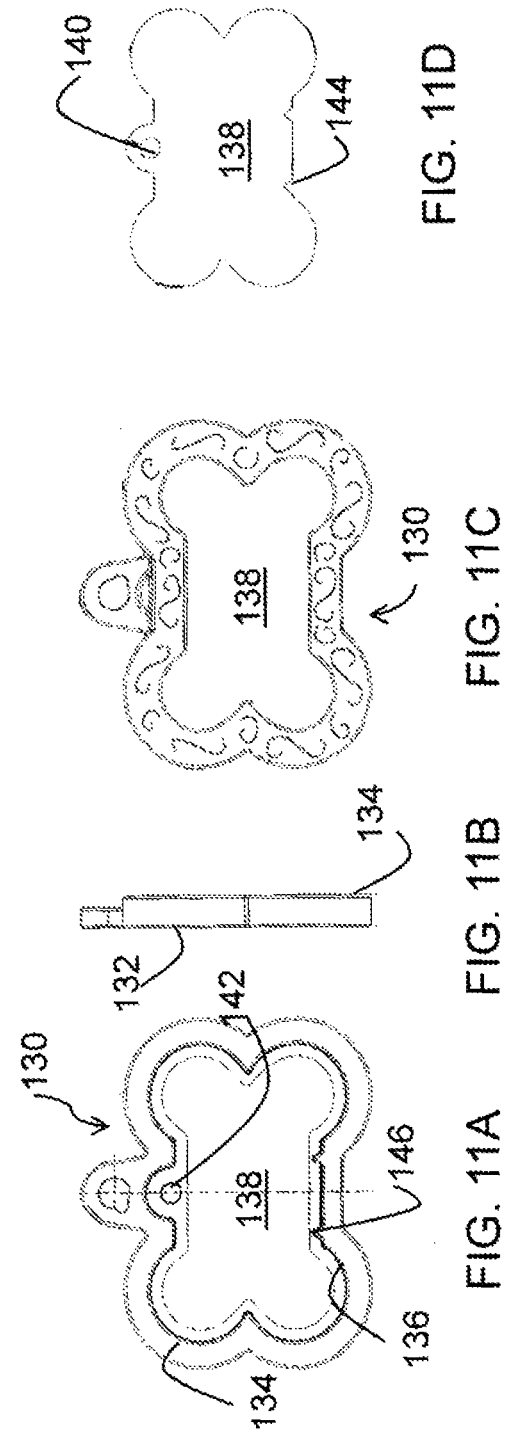

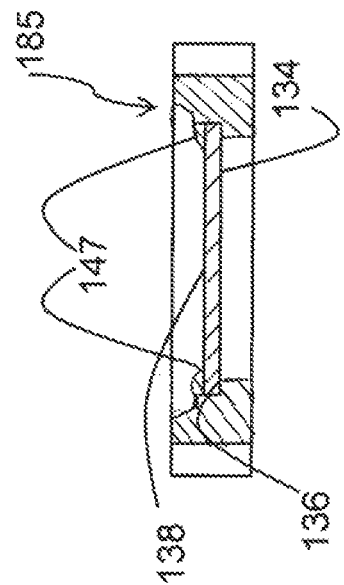
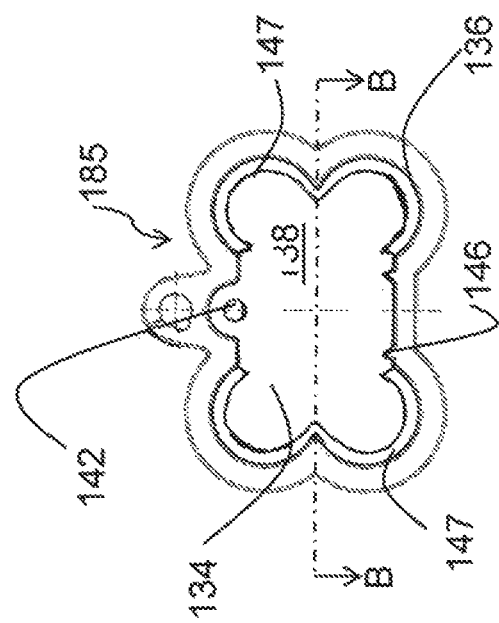
FIG. 16B
FIG. 16A

PET TAGS

CROSS REFERENCE TO RELATED APPLICATIONS

This is a continuation-in-part application of patent application Ser. No. 12/105,589, to Hagen et al. filed Apr. 18, 2008 and titled "PET TAGS," which issues as U.S. Pat. No. 7,877, 909 on Feb. 1, 2011 and which application claims benefit of the filing date of U.S. Provisional Patent Applications 60/912, 609 to Hagen et al. entitled "Pet Tags," which was filed on Apr. 18, 2007 and 60/915,739 to Hagen et al. entitled "Pet Tag marking System," which was filed on May 3, 2007, the disclosures of all of which are hereby incorporated herein by reference.

BACKGROUND

1. Technical Field

Aspects of this document relate generally to pet tags. More specific implementations involve pet tag structures configured to protect one or more images marked on one or both sides of a pet tag.

2. Background Art

Conventionally, pet tags come in many sizes and shapes. They are traditionally made of plastic or a metallic material such as anodized aluminum, chrome or brass. Anodized aluminum pet tags may be colored, stained or have a decorative design printed on them during tag manufacture. Pet tags are conventionally marked with information about the pet, such as the pet's name, address, owner, registration numbers, and the like. The marking is most typically done with a diamond tipped stylus, stamped into the surface of the tag or laser etched onto the surface of the tag. Sometimes, pet tags are added to devices that include electronics such as lights or locating beacons.

After marking, tags are sometimes modified by adding a tag silencer in the form of an encasement like a box, or a removable plastic or rubber sleeve with a window opening to silence the tags from clanging together. U.S. Pat. No. 6,367, 426 to Schaible (issued Apr. 9, 2002) describes an example of a pet tag silencer pocket. Another form of tag silencer that is conventionally sometimes sold separately and added to a pet tag after marking is a rubber frame that lines the edges of the pet tag to muffle the sound of the tags clanging against each other.

Typically, pets have more than one pet tag. Each pet typically has a tag from the state to indicate the pet's registration information, one or more pet tags from the pet's owner with the pet's name, home address and phone number, a tag from the pet's veterinarian stating that the pet has been vaccinated, and one or more additional tags or decorations hanging from the pet's collar. Conventional pet tags have the conventional problem that as the multiple tags rub together when they hang from the pet's collar and the conventional tag surfaces rub against the pet's feeding bowl, they have a strong tendency to wear down over time to a point where the words on the tag are distorted or no longer readable. Because the pet tags are typically used for the safety of the animal and the public, this is a known problem causing pet owners concern.

Others have attempted to solve this known problem by engraving deeper letters in tags made of stronger metal, such as stainless steel or brass. These too, however, eventually wear down, are not conducive to public kiosk-type creation, and are more expensive than conventional anodized aluminum tags.

SUMMARY

Aspects of pet tag implementations disclosed herein relate to protection of text and/or images marked on the pet tags. Not all implementations require every aspect of every implementation, and many implementations may only use one or more of the beneficial features and aspects.

In one aspect, this document features a pet tag configured for marking in an automated pet tag marking kiosk. The pet tags comprise a marking substrate with a marking surface and a collar ring hole. The collar ring hole comprises an alignment feature that either extends from a side of the collar ring hole at non-vertical angle with respect to the collar ring hole and has a shape formed by the collar ring hole and alignment feature combination that is asymmetrical for all but one cross section of the shape, or extends from a side of the collar ring hole at a vertical angle and has a shape that is asymmetrical for all cross sections of the shape.

In another aspect, this document features a pet tag configured for marking in an automated pet tag marking kiosk where the pet tag comprises a marking substrate with a marking surface that has a raised periphery.

In still another aspect, this document features a pet tag configured for marking in an automated pet tag marking kiosk where the pet tag comprises a boarder having a front surface raised above the marking substrate. The pet tags comprise a marking substrate with a marking surface, a frame fixedly coupled to the marking substrate and exposing the surface, and a collar ring hole coupled to the frame. In this aspect's implementations, the frame is fixedly coupled to the marking substrate prior to marking the pet tag in a marking kiosk.

In yet another aspect, this document features a pet tag comprising a first substantially planar substrate with a marking surface on its front surface, a plurality of recesses formed in the front surface and a crystal embedded in each of the recesses. A second substantially planar substrate is coupled to the rear surface of the first substrate.

In still yet another aspect, this document features a pet tag kit comprising a marking substrate with a marking surface, a flat, flexible, transparent protective shield, a connector, and written assembly instructions. The pet tag, the protective shield, the connector and the instructions are included together in packaging, and when assembled according to the instructions, the protective shield is placed on the marking surface after the pet tag has been marked and the connector is coupled to the pet tag to couple the pet tag to a pet collar. In particular implementations, the pet tag comprises a frame fixedly coupled to the marking substrate and exposing the marking surface.

In particular implementations, the pet tag further comprises a frame surrounding the marking surface and a collar ring hole coupled to or extending through the frame. In particular implementations involving a frame, the marking substrate may comprise at least two attachment divots on its periphery mated with at least two attachment projections extending from the frame. In particular implementations, the collar ring hole is formed through the marking substrate. In particular implementations, the shape formed by the collar ring hole and alignment feature combination is keyhole shaped. In particular implementations comprising an alignment feature, the alignment feature may be at a horizontal angle between 180 degrees and 360 degrees.

In particular implementations, the raised periphery is raised at least 0.001 inches from the center of the tag. In some particular implementations, the marking surface comprises a radius of curvature. In some implementations, the marking surface is cup shaped.

In particular implementations, the substrate comprises an anodized marking surface. In particular implementations, the frame comprises a zinc frame. In many particular implementations, the collar ring hole comprises an alignment feature extending from a side of the collar ring hole, wherein the alignment feature either extends at a non-vertical angle with respect to the collar ring hole and the shape formed by the collar ring hole and alignment feature combination is asymmetrical for all but one cross section of the shape, or extends at a vertical angle and the shape is asymmetrical for all cross sections of the shape. In particular tag implementations, the frame comprises a pocket extending along an edge of the frame into which the marking substrate is coupled. In other particular tag implementations, the frame comprises a recess in the front surface into which the marking substrate is coupled. In still other particular tag implementations, the tag comprises a substantially planar substrate pivotably coupled to the frame so that the marking substrate and the planar substrate pivot with respect to each other to expose and cover the marking surface. In some implementations involving a frame, the marking substrate may comprise at least two attachment divots on its periphery that are mated with at least two attachment projections extending from the frame.

In another implementation a pet tag configured for marking in an automated pet tag marking kiosk comprises a marking substrate comprising a marking surface, a frame fixedly coupled to the marking substrate and exposing a majority of at least one side of the marking surface, the frame comprising, a border having a front surface raised above the marking substrate, a collar ring hole coupled to the frame, and at least two portions of the border mechanically flattened partially subsequent to the marking substrate being placed in the frame such that each of the at least two flattened portions of the border extends over at least one portion of the marking substrate.

Particular implementations may comprise one or more of the following features. The at least two portions of the border mechanically flattened may comprise two elongated stakes located opposite each other on the frame. The at least one portion of the marking substrate may comprise an edge of the marking substrate. The marking substrate may comprise an anodized aluminum marking surface. The frame may comprise a zinc frame. The pet tag may further comprise at least two support stakes extending from the border that mate with at least two attachment features on the marking substrate periphery. The at least two flattened portions of the border may comprise the at least two support stakes such that a portion of each of the two support stakes extends over the at least one portion of the marking substrate. The frame may comprise a pocket extending along an edge of the frame into which the marking substrate is coupled. The frame may comprise a recess in a surface into which the marking substrate is coupled. The collar ring hole may extend through the frame. The collar ring hole may comprise an alignment feature extending from a side of the collar ring hole, wherein the alignment feature extends at a non-vertical angle with respect to the collar ring hole and a shape formed by the collar ring hole and alignment feature combination is asymmetrical for all but not more than two cross sections of the shape, or extends at a vertical angle with respect to the collar ring hole and is asymmetrical for all cross sections of the shape. The collar ring hole may be formed through the marking substrate.

A method of securing a marking substrate to a pet tag frame may comprise coupling a metal frame to a marking substrate with a majority of at least one side of the marking substrate exposed, the frame comprising a recess into which the marking substrate sits, and deforming a portion of the metal frame adjacent to the marking substrate by mechanically compressing and deforming the portion of the metal frame such that the portion of the metal frame extends over at least a portion of the marking surface to fixedly couple the marking substrate to the frame within the recess.

In particular implementations, deforming the portion of the metal frame adjacent to the marking substrate may comprise deforming a portion of at least one support stake that extends from the frame into a portion of the marking substrate such that the deformed portion covers at least a portion of the marking substrate. Deforming the at least one support stake may comprise deforming at least two support stakes. Deforming a portion of the metal frame may comprise deforming at least two portions of the metal frame. The at least two portions of the metal frame may be on opposing edges of the metal frame.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and:

FIG. 1 illustrates a front view and a cross-sectional view of a particular implementation of a first concave pet tag configuration;

FIGS. 2A and 2B illustrate views of two particular implementations of a second concave pet tag configuration;

FIG. 3A illustrates three views of a particular implementation of a first joined pet tag configuration;

FIG. 3B illustrates four particular implementations of joined pet tag configurations;

FIG. 3C illustrates a particular implementations of a concave pet tag with a raised edge on its convex side;

FIG. 3G illustrates two views of a particular implementation of a hinged pet tag;

FIG. 3H illustrates two particular implementations of an angled pet tag;

FIGS. 4A, 4B and 4C illustrate views of parts of a particular implementation of a first bordered pet tag configuration;

FIG. 5 illustrates an opened view of a foldable frame ring of a particular bordered pet tag configuration;

FIGS. 6A and 6B illustrate front and top views of a pocket frame ring of a particular bordered pet tag configuration;

FIGS. 8A, 8B and 8C illustrate three views of a first implementation of a pet tag with a marking substrate inserted into a recess of a frame with an alignment feature coupled to the frame;

FIG. 8D illustrates a first implementation of a pet tag marking substrate for the implementation of FIG. 8C;

FIGS. 9A, 9B and 9C illustrate three views of a second implementation of a pet tag with a marking substrate inserted into a recess of a frame with an alignment feature coupled to the frame;

FIG. 9D illustrates a second implementation of a pet tag marking substrate for the implementation of FIG. 9C;

FIGS. 10A, 10B and 10C illustrate three views of a third implementation of a pet tag with a marking substrate inserted into a recess of a frame with an alignment feature coupled to the frame;

FIG. 10D illustrates a third implementation of a pet tag marking substrate for the implementation of FIG. 10C;

FIGS. 11A, 11B and 11C illustrate three views of a fourth implementation of a pet tag with a marking substrate inserted into a recess of a frame with an alignment feature coupled to the frame;

FIG. 11D illustrates a fourth implementation of a pet tag marking substrate for the implementation of FIG. 11C;

FIGS. 16A and 16B illustrate two views of an implementation of a pet tag with a marking substrate inserted into a recess of a frame with elongated support stakes.

DESCRIPTION

Figure 3D:
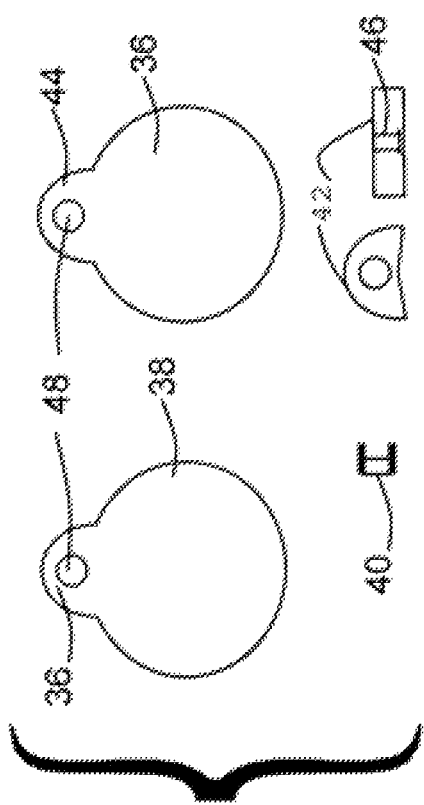
FIG. 3D illustrates particular implementations of a coupling to join two or more pet tags.

This disclosure, its aspects and implementations, are not limited to the specific components or assembly procedures disclosed herein. Many additional components and assembly procedures known in the art consistent with the intended pet tags and/or assembly procedures for a pet tag will become apparent for use with implementations of pet tags from this disclosure. Accordingly, for example, although particular pet tags are disclosed, such pet tags and implementing components may comprise any shape, size, style, type, model, version, measurement, concentration, material, quantity, and/or the like as is known in the art for such pet tags and implementing components, consistent with the intended operation and use of a pet tag.

Particular implementations of pet tags disclosed, although particularly useful for marking with a laser, may alternatively be marked through any of the following non-limited methods including: heat embossing, stylus marking, stamping, laser etching, pad print imprinting, punching, acid etching, painting, writing or through other methods known in the art and should not be considered limited merely to laser marking simply because laser marking is provided as a primary example. For example, those pet tags having a flat printing surface are conducive to printing using stamps or a diamond tipped stylus if they are marked prior to adding additional features on the surface of the tags, if any, prior to recessing the components into another material, or if the marking equipment is modified to mark onto surfaces recessed from a border. Even the concave tag designs disclosed may be marked with methods other than a laser if the method is capable of or modified to mark on a small concave surface.

Many primary implementations are disclosed along with related examples, variations and options. Each primary implementation, among other advantages, helps to extend the usable life of the pet tag by protecting the tag text from wear.

Many examples of each of the primary implementations are contrary to conventional pet tag marking principles because the hard edge around the marking surface of the tag is raised with respect to the center of the marking surface. When conventional pet tags are marked, the tag marking surfaces are flat and do not include a raised edge. This may be because conventional pet tag marking systems include a marking tool that travels close to the surface and causes a risk that the marking tool would be damaged by a raised hard edge. Flat tag marking surfaces may also relate to increasing the speed for marking the tags, which is generally a concern in automated marking systems, or to the inability of particular marking systems to print on non-flat surfaces. Non-flat surfaces on a pet tag may also cause mechanical and other problems with marking depending upon the marking technique. For example, non-flat surfaces have a tendency to cause liquids, such as paints, inks and acids to run or pool, and non-flat surfaces are difficult for mechanical tools to print on due to the adjustment in the tool required to adapt to the non-flat surface.

Known conventional automated tag marking kiosks do not include a z-axis adjustment for the marking implement and, therefore, are unable to mark pet tags with a raised edge. To add the z-axis controls that would allow a mechanical system to step over a raised edge on a tag adds significant cost to the kiosk, causes additional potential for mechanical error and malfunction and adds to the maintenance costs.

Each of the particular implementations described may be marked by a laser marking system such as that disclosed in provisional application titled "Pet Tag Marking System" filed May 3, 2007 to Hagen et al. and its related utility application being prepared. Particular implementations may also be marked by other marking tools that have been modified to mark pet tags having raised edges on or around the marking surface. Many of the particular tag implementations have hard raised edges comprising metal or some other non-flexible material for increased durability and protection.

A first implementation of a pet tag comprises a concave tag shape. FIG. 1 illustrates a non-limiting example of a concave tag 2. The illustration to the left of FIG. 1 is a front view and the illustration to the right is a cross-sectional view taken along the sectional lines of the illustration to the left. Although the concave tag 2 may be marked on both the front and back sides, it is anticipated that in many cases such tags will be marked only on the concave side 4 to protect the marked text and image (collectively "image"), or at a minimum the most important information, such as the address for the pet, would be marked on the concave side 4 for its protection. In a particular implementation, a pet's name is marked on the convex side 6 of a pet tag 2 and the pet's address is marked on the concave side 4 of the pet tag 2. The pet tag 2, when coupled to the pet's collar, may be placed adjacent a conventional flat tag with the concave side 4 facing the flat tag and the convex side 6 facing out.

The particular dimensions and shape of particular concave implementations are not crucial and are contemplated to have a width and length within the range of conventional pet tags. The depth of a concave shape for a pet tag 2 may also be within a reasonable range, though it, too, is not crucial to functionality. Having a concave depth "D" of even a small amount will serve to protect the marked image. The particular implementation shown in FIG. 1 comprises a concave depth of only about 0.004 inches with a consistent radius of curvature of 24 inches forming a dish. A shallower concave depth D of even, for example, 0.001 inches would still protect the text better than a flat tag would. A deeper concave depth D with a smaller radius of curvature R will also protect the marked image for more wear. For example, a depth D of up to even 0.1 to 0.3 inches would provide wear protection and still provide an attractive tag. Formation of a radius of curvature R for a pet tag may be accomplished in any method known in the art such as, by non-limiting example, stamping. In a particular implementation, a raised edge 8 is formed on the pet tag 2 when the pet tag 2 is die cut from a larger plate or sheet of pet tag material.

It is also important to note, however, that the concavity of the depth need not smoothly transition or have a consistent radius of curvature. For example, provided the edge of the marking surface was raised, the marking surface could be stamped to include a recessed center with raised edges so that the center was generally flat with raised edges like a cup. In another contemplated implementation, the center of the concave side recesses to a plane rather than a curved surface. FIG. 2A illustrates a non-limiting second example of a concave pet tag 10 with a raised edge 12 relative to its center 14. FIG. 2A includes a cross-sectional view of the tag and a front view of the tag similar to FIG. 1. FIG. 2B illustrates a non-limiting third example of a concave pet tag 16 with a raised edge 18 relative to its center 20. In the example of FIG. 2B, a first edge 18 is raised relative to the center 20 of the inside of the cup shape and the edge 22 around the base of the cup shape is raised relative to the center 24 of the base of the cup shape giving the base of the cup shape a concave shape. In this implementation, both the front and back sides of the pet tag are structurally protected by the raised edges using a single piece of material.

In wear tests performed by rubbing a concave tag together with a conventional flat tag on a pet collar, it was found that the image marked on the concave tag was not significantly impacted by the rubbing of the concave tag against the conventional flat tag in situations where an image marked on a flat tag would have been significantly impacted on a conventional flat tag. It should be clear from the many examples provided within this disclosure that each of the aspects of the various implementations may be applied to other tags having other shapes and that the number of shapes possible for forming a pet tag is endless. The use of any particular shape in reference to a particular implementation or aspect is purely for exemplary purposes and is not intended to imply its function only for a particular shape.

For each of the particular implementations of pet tags described herein, the raised border may be added prior to marking, at the time of tag manufacture. In addition to providing the pet tag with added weight, strength and aesthetic design for particular implementations, a raised border also protects the image marked on the tag against wear caused by normal pet activity and/or multiple tag rub. By including the raised border during the conventional manufacturing process, cost may be reduced and durability may be increased.

FIGS. 3A-3H illustrate other non-limiting examples of various other pet tag aspects that may protect all or a portion of one or more images marked on a pet tag. FIG. 3A, for example, shows three positions for a pet tag implementation comprising two pet tags coupled together at a collar ring hole so that the two pet tags slide laterally with respect to each other but do not flare away from each other to a significant degree. Dashed lines in the drawings represent the position of a portion of the second tag behind the first tag. The tag coupling is configured so that a minimum force is required to slide the pet tags laterally (i.e. they are stiff to move) so that they do not simply swing free. Because the tags are kept in a relatively fixed position relative to each other until intentionally separated, an image printed on the surfaces of the tags facing each other is protected by the other tag. An additional benefit of this type of implementation is that the tags do not "ching" against each other and are kept silent as the pet moves.

The specific shape of the tags used can be any shape. In fact, the tags need not even be the same shape. For example, a back tag may be a circular tag and a front tag may be a star or bone shape. Images printed on overlapping portions of the tags will be protected. The circular tags are shown here only as an example of this aspect of a pet tag and are not intended to imply that this aspect relates only to circular tags.

The cross-sectional shape of the tags is also variable depending upon the particular implementation being made. For example, as illustrated by the cross-sectional shapes shown in FIG. 3B. The cross-section of the tags may both be flat (as illustrated in the top left image of FIG. 3B) or may both be curved (as illustrated in the bottom left image of FIG. 3B) or have some other concave shape such as that explained with reference to FIG. 2A or 2B. The tags may have a raised border 30 on an external surface (as illustrated in the top right image of FIG. 3B), an internal surface, or both (as illustrated in the bottom right image of FIG. 3B).

FIG. 3C, although only a single tag 32 is shown, illustrates, similar to the illustration provided with reference to FIG. 2B, that a pet tag 32 may comprise both a concave shape and a border to protect images on both sides of the pet tag 32 whether it is combined with another tag or designed for use alone.

FIG. 3D illustrates that the joined pet tag aspect explained above may be created jointly so that the tags are securely fastened together prior to marking the tag, or may be marked separately and later joined by a customer or other person, or assembled by the customer or other person and then marked. In this way, the combination tags may be sold as a kit or may be sold in conjunction with a kit to couple the tags together. This coupling may be accomplished simply with features integral to the tags themselves, or through separate pieces. In the particular kit implementation shown in FIG. 3D, two tags 36 and 38 are initially separate but sold with a coupler, by non-limiting example, like a rivet 40 (illustrated on the bottom left of FIG. 3D) or a rubber or plastic cap 42 (illustrated in front and bottom views on the bottom right of FIG. 3D), that slides over the ring holder portion 44 of the two tags 36 and 38 and has a finger 46 that extends through the ring holes 48 of the two tags to hold them together, but maintains a ring hole 48 through the coupler 42. The flexible rubber or plastic cap 42 of the bottom right implementation of FIG. 3D causes a tendency to push the two tags to a quiescent state where they are overlapped and together, but allows them to be separated to view text printed between them. A cross-section of two implementations involving rivets 40 are illustrated on the right side of FIG. 3B.

Figure 3F:
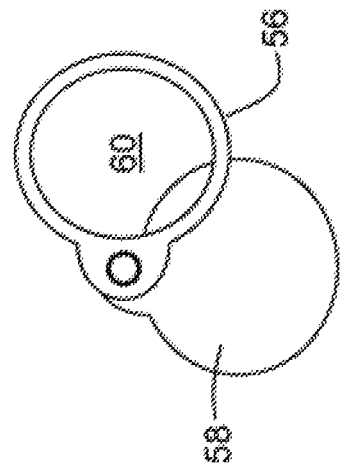
FIG. 3F illustrates a particular implementation of joined pet tag configuration with a border pet tag on top.
Figure 3E:
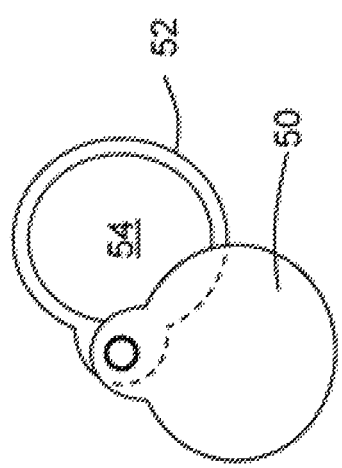
FIG. 3E illustrates a particular implementation of joined pet tag configuration with a recessed pet tag.

FIG. 3E illustrates yet another non-limiting implementation of a pet tag combination comprising a front tag 50 comprising a pet tag design according to an implementation described herein, and a rear tag 52 comprising a recessed center portion 54 into which a marking substrate (see FIG. 9D) may be placed. Placement into the recessed center portion 54 may be configured with a mechanical locking feature or "snap-in" feature that causes the rear tag 52 to engage the marking substrate being placed therein. Alternatively, the rear tag 52 and marking substrate may be coupled together using any other method described herein or known in the art. The rear tag 52 may include only a recessed aperture 54, or may have an opening all the way through so that it forms a ring into which a marking substrate may be received. Thereafter, the front tag 50 may be pivoted to cover and protect the plate within the rear tag 52.

FIG. 3F illustrates yet another non-limiting implementation of a joined pet tag comprising a protective ring 56 on the front side of the pet tag that can slide laterally with respect to the rear tag 58. The protective ring may be hollow, or may comprise a transparent or translucent film 60 or layer therein.

FIG. 3G illustrates yet another non-limiting implementation of a pet tag comprising two pet tag surfaces 62 and 64 joined by a hinge 66. In an open position, such as that shown on the left side of FIG. 3G, the inside surfaces 63 and 65 of the pet tag may be marked, and when the hinge 66 is closed the inside surfaces 63 and 65 are pushed together so that they are facing each other and an image marked on the inside surfaces 63 and 65 is protected. To view the image, the hinge 66 may be opened. As illustrated in dashed lines on the illustration on the right side of FIG. 3G, a collar ring hole 68 may extend from the tag from virtually any location, two examples of which are shown. Additionally, the pet tag marking surface 63 or 65 may alternatively be configured with a collar ring hole. The hinge may be made stiff to restrict the opening and closing of the tag to when the tag is intentionally opened, or may be made loose. FIG. 3G also illustrates, in combination with earlier examples, which joined tag implementations may be joined to swivel laterally or hingedly open with respect to each other.

FIG. 3H illustrates yet another implementation similar to that described with reference to FIG. 3G, but having no hinge. Instead, a relatively flat plate is divided (or even simply bent) into two sections 70 and 72 joined along a line so that the two sections 70 and 72 are at an angle alpha ($\alpha$) relative to the plane of the other. As will be clear from this implementation, an image marked on the inside of the angle is protected from wear to a greater degree than if the pet tag were flat. The end view of the implementation shown on the left side of FIG. 3H has no added border. The implementation shown on the right side of FIG. 3H illustrates that a border or raised ridge 74 may be included to provide protection to images on the outside of the angle as well. Although the border is shown on only two edges of the pet tag, it could alternatively be provided along more edges. Borders may be added before or after marking the pet tag. The pet tag may be configured with mechanical features adapted to mate with corresponding features (not shown) on the border pieces.

FIGS. 4A-4C in combination illustrate a non-limiting example of a flat pet tag 80 and border 82 for a heart-shaped pet tag coupled together in FIG. 4C with a rivet 84. A concave pet tag may alternatively be used with a border. It should be clear that implementations of any shape and/or size are also possible and contemplated by this disclosure. The boarder for this implementation forms a raised edge for the pet tag.

FIG. 5 illustrates a border implementation where a front 86 and a back 88 border are formed as an integral unit prior to coupling to the tag marking substrate and can be folded around the tag marking substrate (not shown) and secured at the collar ring hole 90 for the tag. The two matching halves 86 and 88 of the tag may be coupled together around a similarly shaped anodized marking surface and locked together by crimping or by a rivet through the collar ring hole, by adhesive, or by some other method known in the art. Note that the collar ring hole 90 for this implementation is not symmetrically round. For any implementation, the collar ring hole may be made any shape and that shape may be used for aligning or matching a particular tag with its marking system. Examples of collar ring holes that may assist with aligning or matching a particular tag include symmetrical and non-symmetrical shapes such as squares, polygons, ovals, egg-shapes, stars, clovers, moons, and any other shape that, for alignment implementations, will mate with a corresponding pin to allow orientation to be determined by the mating pieces, and for preventing rotation of a border, can receive an appropriately shaped rivet to prevent rotation due to the non-symmetrically round shape.

In other particular implementations, bendable components may be added to a pet tag design to fold around an edge of a pet tag border from a rear pet tag or around a pet tag from a border, or to fold from a front or rear pet tag to a joined pet tag to restrict the pieces from movement relative to each other. The folding components may be made of malleable, yet durable, metal that may be folded and unfolded repeatedly without breaking, plastic or rubber, or some other material, such as Velcro® or even magnets (in particular implementations where magnets will stick to the pet tags).

Additionally, it is contemplated that in particular implementations a rubber band, by non-limiting example a clear or translucent rubber band, may be used to hold the components together to restrict their relative movement. In one particular implementation for use as a pet tag silencer, a clear rubber band is used to hold two pet tags together by wrapping the rubber band around the pet tags' approximate center or even simply near the top of the pet tags near the collar ring hole. In another particular implementation, two pet tags are each adorned with a rubber band. The rubber band reduces the likelihood that the images on the facing sides of the pet tags will rub each other and silences much of the sound caused by the tags hitting each other. In yet another particular implementation, a clear plastic or rubber sleeve is placed over one or a plurality of tags to protect images marked on the tags and as a silencer.

FIGS. 6A and 6B illustrate an implementation of a pet tag 92 where a tag marking substrate 94 comprising an anodized marking surface is slid into a pocket 98 in a top surface of a frame 96 so that the anodized marking surface shows through the frame. Note that in this implementation, unlike the implementation of FIG. 5, because the sides and bottom of the pet tag 92 may be closed and still allow the anodized marking surface to be placed in the frame 96, the marking substrate may be made a different shape than the frame 96, like a rectangle. The marking substrate 94 may be retained within the frame 96 by such non-limiting methods as crimping the top of the frame 96, adding a rivet or other retainer in the collar ring hole 100, soldering or welding the top of the frame 96, and the like.

Alternatively, an implementation that would look similar to FIG. 6 may be made by placing a tag marking substrate in a mold and injection filling the mold with a powdered metal that is baked to harden in the desired shape. Alternatively, a rubber or plastic material may be molded or otherwise formed around a tag marking substrate, such as an anodized marking surface or brass plate. Alternatively again, a frame may be formed and a tag marking substrate, such as an anodized aluminum plate of appropriate shape, may be set into the recessed front surface of the frame.

In particular implementations of a pet tag, front and rear tag components may be sandwiched around a marking substrate, such as an anodized marking surface or brass plate, and snapped together or otherwise coupled together. By non-limiting example, a rear pet tag and a front border may each be configured with structures that allow the two components to be fixedly coupled together. The rear pet tag may comprise a marking substrate or the combination of the rear tag and the front border may be configured to receive the marking substrate there between when the rear tag and the front border are coupled (see, for example, FIGS. 14A-14C). Alternatively, some bendable component associated with either the rear tag, the border, or both may be used to join the rear tag and the border. Examples of bendable components were discussed earlier in relation to the joined tags implementations. In another particular example, the front and rear tag components may be coupled using sliding rails. For example, a male rail in a first component and a female rail in a second component may be coupled to each other. This particular example not only couples the front and rear tag components together around the marking substrate, but also maintains the relative rotational positioning of the front and rear tag components after slidably engaging them together.

In many of the implementations, the border may be coupled to the tag marking substrate on one or both of the front and the back of the tag marking substrate. For particular implementations, the tag marking substrate will be sandwiched between two border components. The border components may be coupled to the tag marking substrate in any fashion known in the art for coupling the components together such as by adhesive, heat or other form of welding, an additional compression member such as a rivet through the matching opening(s) in the tag marking substrate and the border, by crimping or by some other method known in the art.

The width and thickness of the border, like the depth of the concave tag in earlier implementations, is not crucial to the pet tag. The desired width and thickness will depend upon the type of material used for the border, its wearability and aesthetic purposes relating to the weight of the finished tag on a particular pet and the proportions of the border in relation to the tag marking substrate. Any border will provide increased protection for the image on the substrate. By permanently affixing the border to the tag during manufacturing and before marking, the border becomes an integral part of the finished tag.

The pet tag examples described herein may be formed of any of a number of conventional materials used for forming pet tags such as brass, chrome, aluminum, and plastic. Unconventional materials such as rubber may also be used. Because the various implementations of pet tags illustrated and described do not require the conventional flat tag approach and can have raised edges and other portions, including non-flat and even textured marking surfaces, the possibilities for materials and material combinations for pet tags are endless.

For example, the border or frame may be made of a different material than the marking substrate. The marking substrate should be made of a markable material, the specific material depending upon the marking method being used. For conventional pet tags, marking with a diamond stylus on stained aluminum, or a soft anodized aluminum is commonly used in the art. For particular implementations used for laser etching, anodized aluminum will provide a more durable and better looking tag. An anodized aluminum tag comprises a protective surface. When a diamond stylus is used to etch an anodized aluminum tag, the protective surface is scraped away causing it to crack and damage the finish. With laser etching, the protective surface remains as the anodized coloration below the protective surface is vaporized to an opaque color by the laser to create a color contrast with the remaining material. Chrome and brass are common materials used in systems that use a diamond stylus or stamping to mark pet tags. Combinations such as a nickel, chrome, brass, pewter, silver, gold, zinc or other metal or composite border or frame with an anodized aluminum marking surface are specifically contemplated combinations. Alternatively, plastic, rubber or other integrally formed flexible frames or borders with a chrome, brass, pewter or anodized aluminum marking surface are also specifically contemplated. Materials may be cast, sculpted, injection molded or otherwise formed according to conventional methods known in the art for forming the materials used.

Conventional pet tags for marking comprise only one type of metal when they are being marked. The marking substrate is typically anodized aluminum, which is a relatively soft metal, or brass, which is harder. The soft metal is easy to mark with an image, but wears out too fast. The harder metals are more durable to wear, but take much longer to mark and cause greater wear on mechanical stylus marking implements. Many implementations of pet tags disclosed herein comprise a marking substrate made of a relatively soft metal, such as anodized aluminum, framed by a much harder metal such as brass, pewter, chrome, nickel, silver, gold or zinc. The unique combination of the soft metal for marking and the hard metal frame to protect the text enables realization of faster marking times, less wear on the marking implements and more durable tags.

The materials used for forming the tags may also be pretreated, such as with a color or coating, to alter the look, texture or performance of the material. By non-limiting example, the chrome or brass may be brushed with an abrasive material for a brushed metal look. For anodized aluminum, a pigment layer may be added to color the aluminum. In one particular example for use with 10 watt lasers for marking, an anodized pigment layer, virtually any color is possible. Coatings may also be added, such as ultraviolet (UV) protective coatings, scratch resistant coatings, or powdered metal coatings known in the art. In addition to the protection offered by the raised edge, additional laminate or other coatings may be added to protect the pet tags. Coatings, layers and other materials having a contrasting surface layer such as stained, anodized or coated metal, are particularly advantageous because smaller, more intricate images may be marked due to the contrast created when a portion of the surface layer is removed to expose the contrasting underlayer.

The exact size of the collar ring holes provided through the pet tags in each of the implementations is not crucial so long as it meets the size, shape and dimension needs of the particular implementation. However, it is anticipated that the collar ring hole for most implementations will be large enough for a typical split ring to extend through it and swing freely, or large enough for a rivet and split ring to extend through if a rivet is used. In particular implementations, the collar ring holes will be round, though other shapes and sizes are also contemplated and may have other advantages to the pet tags and marking process. The collar ring holes in the pet tags may also be adapted to mate with or receive a male pin or other component on a clamping system associated with a marking system. A male pin or other component on the clamping system that mates particularly with the shape of the collar ring hole in the pet tag, or of course the collar ring hole through a rivet if a rivet is used, may further assist in preventing the tag from moving rotationally during the etching process and discourage use of pet tags without that feature in the marking machine.

In another aspect of particular implementations of a pet tag, an alignment feature is used to help determine which side of the tag is facing up. In one particular implementation, a non-symmetrical shape may be used for the collar ring hole through the pet tag and/or rivet, or some other non-symmetrical feature of the pet tag may be used, to ensure that the pet tag is placed in a tag marking receiver with the correct side up. Alternatively, a symmetrical shape may be used but placed non-symmetrically or not centered or otherwise positioned on the pet tag so that placement over an alignment pin will either require the pet tag to be placed in an obviously skewed manner, or be placed with the correct side up.

Figure 7A:
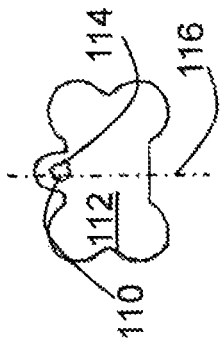
FIGS. 7A, 7B and 7C illustrate three different pet tag shapes each having an alignment feature through the marking substrate.
Figure 7B:
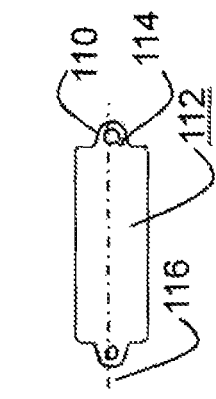
Figure 7C:
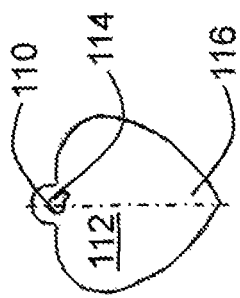
Figure 7E:
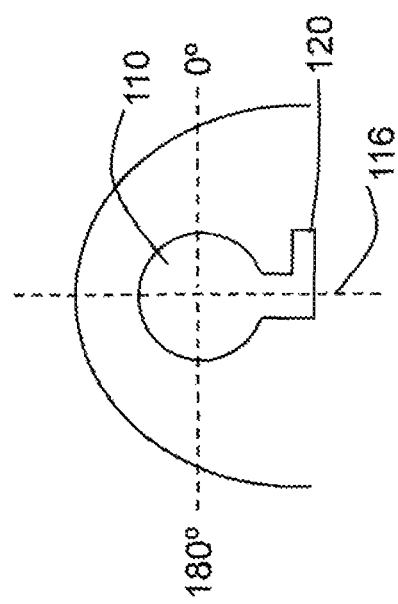
FIGS. 7D and 7E illustrate a close-up view of an alignment feature.
Figure 7D:
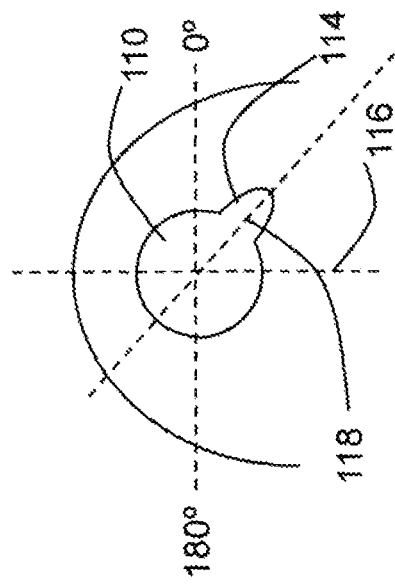

With specific reference to FIGS. 7A-7E, a collar ring hole 110 of a pet tag 112 that comprises an alignment feature 114 extending from a side thereof. FIG. 7D illustrates a first close-up illustration of the collar ring hole 110 and alignment feature 114. For this disclosure, the terms horizontal and vertical as used with reference to the collar ring hole 110 is defined with reference to the top edge of the pet tag 112 which is the side of the pet tag closest to the collar ring hole 110 (and in cases such as FIG. 7B, the side of the pet tag closest the collar ring hole 110 with the alignment feature 114). When marking a pet tag in a public marking kiosk, the pet tag 112 is inserted into a marking kiosk top edge first and aligned in the kiosk symmetrically down the center 116 of the tag 112. Although other shapes are equally and equivalently acceptable, a keyhole shape was selected for these examples as the shape for the combination of the collar ring hole 110 and the alignment feature 114.

To enable the alignment feature 114 to be used to ensure that a desired side of the pet tag is facing up when the collar ring hole 110 is placed over a mating alignment feature, such as a pin, associated with a receiver of a marking kiosk, the combination of the collar ring hole 110 and the alignment feature 114 is uniquely configured. The alignment feature 114 extends either: as shown in FIG. 7D, from a side of the collar ring hole 110 at a non-vertical angle with respect to the collar ring hole 110; or as shown in FIG. 7E, from a side of the collar ring hole 110 at a vertical angle with respect to the collar ring hole 110. In the option of FIG. 7D, the combination collar ring hole 110 and alignment feature 114 shape is asymmetrical (across a cross-sectional line 118) for all cross-sections taken of the shape except for not more than two cross sections. The cross-section line 118 shown in FIG. 7D is an example of a line through the shape where the opposing sides are, and thus the cross-section of the shape is, symmetrical. In this example, therefore, there is only one cross-section of the shape that is symmetrical. All other cross-sectional lines taken of the shape result in asymmetrical sides of the shape. Another shape, such as an oval set at a non-vertical angle, may have two symmetrical cross-sections and still require side-up placement of the pet tag on an alignment pin of the marking kiosk.

In the option of FIG. 7E, the combination collar ring hole 110 and alignment feature 120 extends vertically, but then changes direction so that there are no cross sections that can be taken of this combination shape that result in symmetrical shapes on either side of the cross section line. It will be understood that the alignment feature may extend outwardly from the side of the collar ring hole as illustrated by FIGS. 7D and 7E, or equivalently extend inwardly from the side of the collar ring hole to meet the same purpose of ensuring the pet tag is placed in the marking kiosk with a particular side up. In these examples, if a user attempts to place the pet tag into a marking kiosk with the wrong side up, the collar ring hole and alignment feature shape will not match the pin and, thus, will not fit into the system until it is turned over. In a non-limiting example, this may be particularly useful in implementations that include a side where images are more protected than others and in implementations where only one side of the pet tag may be marked. The raised edge feature of the pet tag may also be used to determine which side of the tag is up by placing the raised edge into a groove or matching the raised edge with a feature on the marking system.

Because it is desirable to have the collar ring hole border thick, to tag extend life shortened by wear on the tag collar ring hole caused by a connector coupling the tag to a collar as it hangs, in many cases the alignment feature extends at an angle between 180 degrees and 360 degrees from the horizontal (see FIGS. 7D and 7E).

FIGS. 8A-11D illustrate non-limiting examples of various configurations of pet tags 130 comprising a decorative front side 132 and a rear side 134 with a recess 136 configured to receive a marking substrate 138. FIG. 8B is shown with hidden dashed lines to indicate the recessed portions of the design. The similar side view illustrations of the tags shown in corresponding FIGS. 9B, 10B and 11B were not shown with hidden dashed lines, but have similar recessed portions for their designs. Each marking substrate 138 design for these particular implementations comprises a pin aperture 140 corresponding to the position of a pin 142 on the rear side 134 of the pet tag frame. The pin 142 provides additional support and positioning for the marking substrate 138. Alignment features 144 in the marking substrate 144 help to align the marking surface 144 with a correct side up, if there is one for the marking substrate 144, and serve a second function of providing structural support for the marking surface 144 when the alignment features 144 receive support stakes 146 from the rear side 134 of the pet tag 130. During assembly, when the marking substrate 144 is placed in the recess 136 of the pet tag, the support stakes 146 are crushed so that the material forming the support stakes 146 flattens partially and extends over a portion of the marking substrate 144 and fixes the marking substrate 144 in place.

The particular example of FIGS. 16A-16B includes an implementation where at least one support stake comprises an elongated stake 147. In the depicted implementation, the pet tag 185 comprises two elongated stakes 147 opposite each other on a back side marking substrate 138 of the pet tag 185 frame. Other features like those illustrated in relation to other implementations and FIGs. described herein may also optionally be used. In other particular implementations, the elongated stakes 147 may comprise any portions of the border and any number of elongated stakes 147 may be used anywhere along the frame. In the depicted implementation, the elongated stakes 147 extend over a portion of the marking substrate 138. The elongated stakes may further comprise any length. The elongated stakes 147 may be flattened in any suitable manner, such as mechanically, by hand, and the like, but it is anticipated that in most implementations a portion of the pet tag frame adjacent to the marking substrate will be mechanically flattened such that the flattened material is displaced to extend partially over the rear edge or side 134 of the marking substrate 138. When flattened, the elongated stakes 147 help to fix the marking substrate 138 in place, thus helping to reduce movement of the marking substrate 138 and secure it within the pet tag frame. Additional support stakes 146 may also be used. Additionally, or alternatively, the support stakes 146 of this or any other implementation within this disclosure may be mechanically flattened, for example with a mechanical press to deform the stake such a portion of the now deformed support stake extends over a portion of the marking substrate 138 adjacent to the support stake. Although the particular implementation illustrated in FIG. 16A is a particular bone-shaped design, other shapes and designs and materials may also be used with this process for securing a pet tag. For example, hearts, circles, tear drops, and any other shape in which a frame and pet tag may be manufactured may benefit from this technique. Furthermore, other materials such as steel, aluminum and brass, which are rigid metals but which can be deformed through a mechanical deformation process, may be used to form the frame and border of the pet tag.

The particular examples of FIGS. 8A-9D include implementations where the front side 132 of the pet tag 130 is enclosed by decoration. The particular examples of FIGS. 10A-11D include implementations where the front side 132 of the pet tag 132 is not enclosed and exposes the marking substrate 144.

Figure 12:
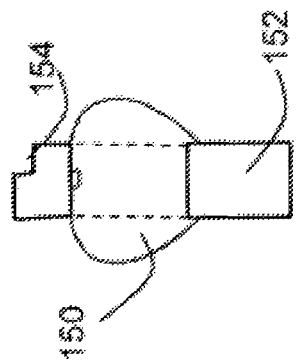
FIG. 12 illustrates a first implementation of a removable bracket coupled to a pet tag.

Although the primary implementations disclosed herein relate to pet tags' integral frames or raised edges that protect images marked on the pet tag, other implementations may comprise other features and elements that also protect images marked on the pet tag. For example, in a particular implementation described in relation to the example provided in FIG. 12, the marking surface 102 of the pet tag 104 may be adapted to receive, through openings 108 in the marking surface 110 or elsewhere on the pet tag 104, protective nubs 106 made of a protective material such as rubber or plastic, that restrict flat objects from rubbing against the surface of the pet tag 104. The protective nubs may additionally be configured to include a slot, recess or other locating feature that mates with an alignment feature on a tag marking system (see, for example, the aspect described with reference to FIGS. 7A-7D). In another particular implementation, the tag may be received by the pet owner as a multiple-piece tag that is assembled by the pet owner either before or after the pet tag is marked. For example, the tag marking substrate may be separate and snapped into a frame after marking or a clam-shell-like piece may snap around a tag marking substrate (see, for example, FIG. 5, but provided as an after-marking addition). The pet tag frame then protects an image on the pet tag from wear caused by rubbing. In still another particular implementation, a two-or-more-pieced frame may be used to fold down over a tag marking substrate after it is marked.

Figure 13:
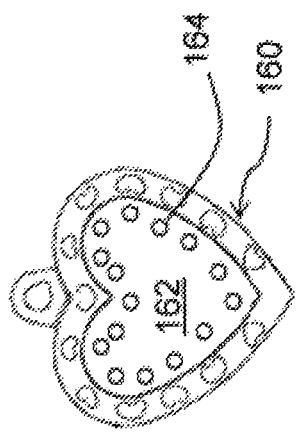
FIG. 13 illustrates a second implementation of a removable bracket coupled to a pet tag.

FIG. 13 illustrates an implementation of a pet tag 150 comprising an additional removable bracket 152 coupled to the pet tag 150. In particular kiosk marking systems, a mechanical stylus may be used to etch an image on the marking surface of a pet tag. The pressure applied by the mechanical stylus requires that the pet tag be supported during the etching process. In particular implementations, of a pet tag, a bracket may be removably coupled to the pet tag during manufacturing so that when the pet tag is placed in the kiosk by the customer, it will be supported and held in place by the bracket extending across supports in the kiosk. For the particular implementation shown in FIG. 13, the bracket 152, formed of plastic, is removably coupled to the pet tag 150. The bracket 152 may be over-molded to the pet tag 150 or may be formed separately and then added to the pet tag 150. The bracket 152 may be coupled directly to the marking substrate or coupled to the marking substrate through a frame or other boarder.

In particular implementations, the bracket 152 is not a support bracket that supports the entire pet tag 150, but instead just couples to a portion of the pet tag 150 and includes an alignment feature 154 built into the bracket 152. In this way, the alignment feature 154 becomes a removable alignment feature coupled to the pet tag 150 for alignment with the marking kiosk during marking that may be removed after the pet tag 150 is marked in the kiosk. The removable alignment feature 154 may be added during manufacture or added just prior to marking, or sometime in between. In particular implementations, a removable cap may be added at the collar ring hole of the pet tag and includes a notch in its side. A clamp in a corresponding marking system may couple to the collar ring hole and reference the notch to confirm which side is facing up. As described with reference to other implementations and examples above, the alignment feature may alternatively, or additionally, comprise a recess or a notch of other shape and/or size.

Other particular implementations of a locating feature that can determine which side of a pet tag is facing up include other topographical features on the pet tag itself that are unique to a particular tag side. Such topographical alignment features, such as a bulge or recess at a particular point on one side of the tag that is not on the opposing side of the tag, may also serve to confirm that a pet tag is face up. Although ideally a common feature on all designs of pet tags to be marked within a marking system would be best, particular implementations may have different features at different locations that a particular system will check to confirm the correct tag marking side is up. Furthermore, although it may further complicate the marking system, this disclosure contemplates a system that may have additional moving parts, such as one or more probes, that can test whether the correct marking substrate is placed up in a particular marking system.

Alternatively, or additionally, a determination of which side is facing up may be made in a marking system through simple sensors, such as color, surface reflectance, magnetism, conductive properties, mechanical sensors, and other sensors, or through more complex sensors using machine vision such as cameras. Locating features on a pet tag may be used independently of, in combination with, or may be replaced with features that cooperate with such sensors in a marking system to determine which side of a pet tag is up prior to marking the tag.

When the tags are etched, similar to existing etching conventions, there may be up to four or five lines of text. Although the uses for pet tags are many, typical information on a pet tag may include, but is not limited to, some of the following information: a pet name; a phone number, a street address, a city, state and zip code; an email address; a license number; a message to someone finding the pet; a standard catchy phrase or slogan; a store or product logo; or other information or message. Front and back of the tag may be printed in many circumstances, or multiple tags may be printed.

Figure 14A:
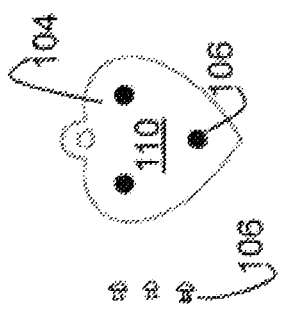
FIGS. 14A, 14B and 14C illustrate three views of an embedded crystal tag.
Figure 14B:
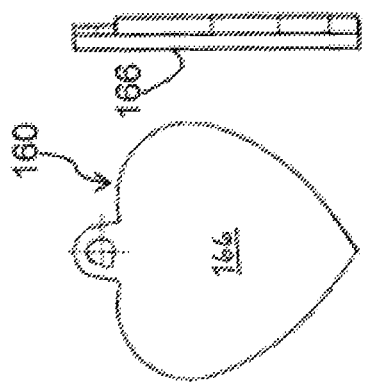
Figure 14C:
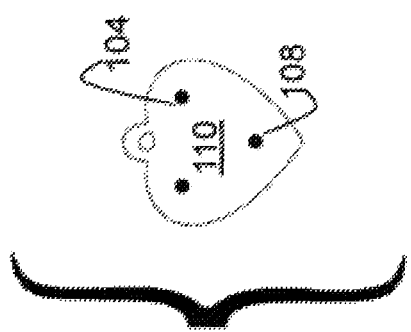

FIGS. 14A-14C illustrate another particular implementation of a pet tag 160 comprising a marking substrate 162 comprising a plurality of crystals 164 embedded in a front surface of the marking substrate 162. The plurality of crystals 164, such as Swarovski crystals, diamonds, zirconium gems or other decorative stone (collectively "crystals"), are embedded in the front surface in recesses in the front surface. The recesses may be formed by punching the recess into the front surface using a stamp index to deform the surface, such as an aluminum surface, or by a more complicated method. The crystals 164 may then be glued in place. When a stamp index is used to deform an aluminum marking substrate, the rear surface of the aluminum surface also deforms slightly where the index punched. As illustrated in FIGS. 14A and 14B, a second substrate 166 is included on a rear side of the pet tag 160 that covers the rear surface of the marking substrate 162. In particular implementations, the second substrate 166 also comprises a marking surface on its rear surface so that a customer can imprint both the front and rear sides of the crystal embedded pet tag.

Figure 15:
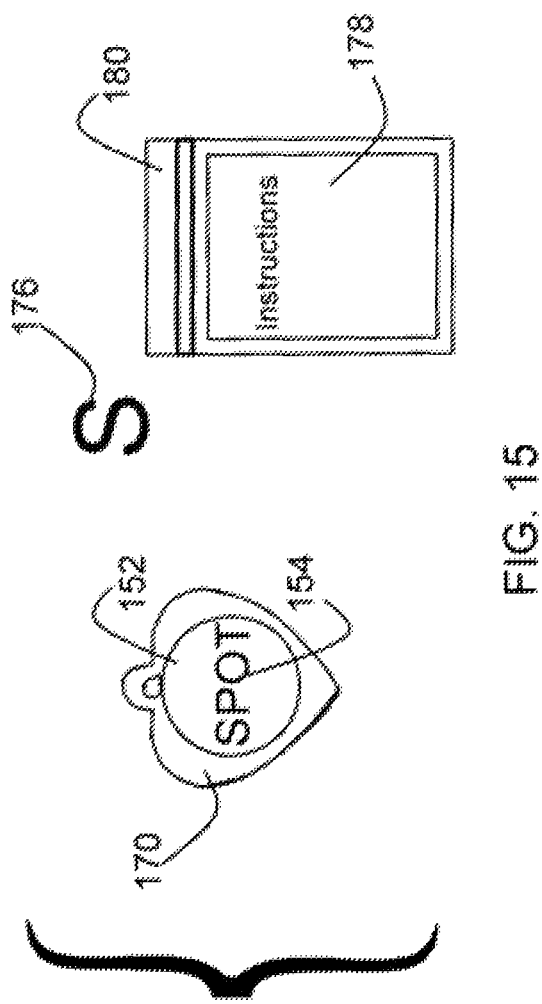
FIG. 15 illustrates a particular implementation of a pet tag comprising a flexible protective film placed on a marking surface of a marked pet tag.

FIG. 15 illustrates several components associated with a pet tag kit. A pet tag kit comprises a marking substrate 170 with a marking surface 172, a flat, flexible, transparent protective shield 174, a collar connector 176, and assembly instructions 178. The kit may also include packaging 180 to hold the kit in for sale and transport. Although the collar connector 176 is shown herein as an "S" connector, split ring connectors or other connectors commonly used for coupling a tag to another structure may be equivalently substituted. When the pet tag is assembled according to the assembly instructions, the protective shield 174 is placed on the marking surface 172 after the pet tag has been marked and the connector 176 is coupled to the pet tag to couple the pet tag to a pet collar. The pet tag included in the kit, although a particular implementation is shown in FIG. 15, may be of any configuration discussed in this disclosure or any other pet tag. The flat, flexible, transparent protective shield 174 is a thin film of material applied by the customer to shield the image on the marking surface 172 from rubbing to the point of wearing off. Although many materials may be used to form the protective shield, it has been found that the Clearcoat Paint Protection Film made by the company 3M works well if cut to the appropriate size. The Clearcoat Paint Protection Film is a urethane base with a pressure-sensitive adhesive on one side. In particular implementations, the pet tag may further comprise a frame surrounding the marking surface that includes a boarder with a front surface raised above the marking substrate as was used in other implementations described in this disclosure.

The components included in particular implementations of pet tags may be formed of any of many different types of materials or combinations that can readily be formed into shaped objects and that are consistent with the intended operation of a pet tag. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the various components forming a particular implementation of a pet tag may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that implementations are not limited to the specific components disclosed herein, as virtually any components consistent with the intended operation of a method and/or system implementation for a pet tag may be utilized. Accordingly, for example, although particular pet tags, edges, frames and other components may be disclosed, such components may comprise any shape, size, style, type, model, version, class, grade, measurement, concentration, material, weight, quantity, and/or the like consistent with the intended operation of a method and/or system implementation for a pet tag may be used.

In places where the description above refers to particular implementations of pet tags, it should be readily apparent that a number of modifications may be made without departing from the spirit thereof and that these implementations may be applied to other pet tags. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A pet tag configured for marking in an automated pet tag marking kiosk, the pet tag comprising:
   a metal marking substrate comprising a marking surface;
   a frame fixedly coupled to the metal marking substrate and exposing a majority of the marking surface, the frame consisting essentially of:
      a border comprising a first surface and a second surface opposite the first surface;
      a recess extending inwardly from the border and positioned between the first and second surfaces of the border;
      a collar ring hole coupled to the frame; and
      at least two mechanically deformed metal portions each extending inwardly from the border over at least one portion of the metal marking substrate and positioned between the recess and the second surface such that the at least one portion of the metal marking substrate is pinned between the recess and a first deformed surface of the respective mechanically deformed metal portion, the at least two mechanically deformed portions further comprising a second deformed surface positioned between the marking substrate and the second surface of the border.

2. The pet tag of claim 1, wherein the at least two mechanically deformed portions comprise two elongated stakes located opposite each other on the frame.

3. The pet tag of claim 2, wherein the at least one portion of the marking substrate comprises an edge of the marking substrate.

4. The pet tag of claim 3, wherein the marking substrate comprises an anodized aluminum marking surface.

5. The pet tag of claim 4, wherein the frame comprises a zinc frame.

6. The pet tag of claim 1, wherein the frame comprises a zinc frame.

7. The pet tag of claim 1, further comprising at least two support stakes extending from the border that mate with at least two attachment features on the marking substrate periphery.

8. The pet tag of claim 7, wherein the at least two mechanically deformed metal portions of the border comprise the at least two support stakes such that a portion of each of the two support stakes extends over the at least one portion of the marking substrate.

9. The pet tag of claim 1, wherein the frame comprises a pocket extending along an edge of the frame into which the marking substrate is coupled.

10. The pet tag of claim 1, wherein the frame comprises a recess in a surface into which the marking substrate is coupled.

11. The pet tag of claim 1, wherein the collar ring hole extends through the frame.

12. The pet tag of claim 11, wherein the collar ring hole comprises an alignment feature extending from a side of the collar ring hole, wherein the alignment feature:
   extends at a non-vertical angle with respect to the collar ring hole and a shape formed by the collar ring hole and alignment feature combination is asymmetrical for all but not more than two cross sections of the shape; or
   extends at a vertical angle with respect to the collar ring hole and is asymmetrical for all cross sections of the shape.

13. The pet tag of claim 1, wherein the collar ring hole is formed through the marking substrate.

14. The pet tag of claim 13, wherein the collar ring hole comprises an alignment feature extending from a side of the collar ring hole, wherein the alignment feature:
- extends at a non-vertical angle with respect to the collar ring hole and a shape formed by the collar ring hole and alignment feature combination is asymmetrical for all but not more than two cross sections of the shape; or
- extends at a vertical angle with respect to the collar ring hole and is asymmetrical for all cross sections of the shape.

15. A method of securing a marking substrate to a pet tag frame, the method comprising:
- coupling a metal frame to a metal marking substrate to expose a majority of a marking surface on the metal marking substrate, the frame comprising a recess into which the marking substrate sits, the recess positioned between a first surface of the metal frame and a second surface of the metal frame opposite the first surface; and
- deforming a portion of the metal frame after the metal marking substrate is within a border of the metal frame by mechanically compressing and deforming the portion of the metal frame until a first flattened surface of the portion of the metal frame extends over and contacts at least a portion of the marking surface to fixedly couple the marking substrate to the frame within the recess and a second flattened surface of the portion is positioned between the marking substrate and the second surface of the metal frame.

16. The method of claim 15, wherein deforming the portion of the metal frame comprises deforming a portion of at least one support stake that extends from the frame into a portion of the marking substrate such that the deformed portion covers at least a portion of the marking substrate.

17. The method of claim 16, wherein deforming the at least one support stake comprises deforming at least two support stakes.

18. The method of claim 15, wherein deforming a portion of the metal frame comprises deforming at least two portions of the metal frame.

19. The method of claim 18, wherein the at least two portions of the metal frame are on opposing edges of the metal frame.

* * * * *